United States Patent [19]
Whalen et al.

[11] Patent Number: 5,555,518
[45] Date of Patent: Sep. 10, 1996

[54] DEPTH SENSING EXPENDABLE OCEANOGRAPHIC PROBES

[75] Inventors: Mark E. Whalen, Mattapoisett; Randall H. Elgin; Michael J. Balboni, both of Wareham, all of Mass.

[73] Assignee: Sippican, Inc., Marion, Mass.

[21] Appl. No.: 349,607

[22] Filed: Dec. 5, 1994

[51] Int. Cl.⁶ .................................................. H04B 1/59
[52] U.S. Cl. ........................... 367/4; 73/170.34; 73/300
[58] Field of Search .............................. 73/170.34; 367/4

[56] References Cited

U.S. PATENT DOCUMENTS

| | | | |
|---|---|---|---|
| 3,552,205 | 1/1971 | Francis | 170/34 |
| 3,561,267 | 2/1971 | Costello | 170/34 |
| 3,991,623 | 11/1976 | Murdock | 170/34 |
| 4,854,728 | 8/1989 | Baron et al. | 374/136 |
| 5,379,267 | 1/1995 | Sparks et al. | 170/34 |

*Primary Examiner*—J. Woodrow Eldred
*Attorney, Agent, or Firm*—Testa, Hurwitz & Thibeault

[57] ABSTRACT

An expendable oceanographic probe includes a body having a weighted nose section and an after body having a tail for stabilization. A spool of wire is paid out through the tail of the after body for coupling to a data acquisition system. The expendable oceanographic probe also includes a sensor exposed to the seawater for measuring a seawater property and for providing a signal representing the measured property to the data acquisition system over the wire. A pressure sensor of the probe is exposed to the seawater for determining the depth of the probe as the probe descends into the seawater with respect to the measured seawater property by perturbing the measured parameter signal at a predetermined pressure.

8 Claims, 4 Drawing Sheets

DEPTH SENSING EXPENDABLE OCEANOGRAPHIC PROBES

FIELD OF THE INVENTION

This invention relates to the field of oceanographic data acquisition and, more particularly, to the use of submersible expendable sensor probes for remotely measuring seawater property data as a function of depth, such as temperature and electrical conductivity characteristics.

BACKGROUND OF THE INVENTION

Oceanographic probes generally consist of a deployable probe unit which includes sensors for measuring the target characteristics, e.g., a conductivity cell for measuring electrical characteristics, and/or a temperature sensor for measuring thermal characteristics. Wires or other means are used for transmitting signals generated by the sensors to a shipboard station. The shipboard station includes instrumentation for translating the signals received from the sensors into data reflecting the characteristics being measured.

Existing probe technology typically makes use of two types of systems to acquire seawater property data as a function of depth. One type of system employs recoverable sensors that can be lowered by cable from a ship or suspended from a moored or free-drifting buoy. The sensors used on such recoverable systems are very accurate, but are typically large and expensive to purchase, maintain, and operate. The depth accuracy of the recoverable sensor system is limited only by the accuracy of the pressure sensor that is attached to the probe. Typical pressure sensor accuracy for a recoverable sensor is ±0.5%. In operation, the recoverable pressure sensor is monitored at every depth at which seawater property data is sampled to provide a depth measurement for the seawater property data collected. Other than high cost, another drawback of recoverable sensors is that the ship or buoys deploying them must be held nearly stationary while collecting data which prevents the collection of synoptic data over any reasonable distance.

The second type of seawater probe system employs expendable, single use, sensor probes that are dropped over the side of a stationary or moving ship or that are launched from an aircraft. Probe sensor data is transmitted to the ship over a wire link that deploys simultaneously from the ship and the probe as the probe free-falls through the water. A considerable quantity of data can be collected over a large area at a relatively low cost. However, the sensors on expendable systems are typically not as accurate as recoverable sensors. Because it is usually desirable to be able to reliably compare data generated by different probes, it is necessary to insure that different probes generate the same data under the same circumstances.

The depth of a probe is an important parameter to consider when taking almost any seawater property measurement. The depth of an expendable probe is inferred from the elapsed time at which each seawater property measurement is taken relative to the probe hitting the seawater surface, assuming a known descent rate. After water entry, it is assumed that the probe follows an empirically determined descent rate. One way to achieve repeatability in the descent rate among probes is to manufacture the probes to very exact weight and dimensions tolerances. The resulting usable depth accuracy of an expendable probe is limited to about ±2%, or ±15 feet, whichever is larger. Descent rate can also vary due to variations in seawater density and variations in initial probe velocity when it enters the sea surface.

Although the accuracy of the various expendable seawater property sensors has improved, the relatively poor depth accuracy of expendable sensor systems has limited their overall usefulness.

Accordingly, it is an object of the present invention to provide an inexpensive, expendable sensor with depth accuracy comparable to typical recoverable systems.

SUMMARY OF THE INVENTION

The present invention features an inexpensive, expendable probe having a compact, high accuracy, low cost pressure sensor incorporated therein to accurately determine probe depth as a function of time. The pressure sensor is monitored simultaneous with other probe sensors that measure various seawater properties as the probe descends.

It is a further object of the present invention to provide a pressure signal during probe descent that does not require a separate data channel for the pressure data. At one or more predetermined pressure threshold values the output of the pressure sensor electric circuit is used to noticeably perturb one or more probe sensor data channels, e.g., cause a noticeable spike or offset in the seawater property data signal. The probe data recording instrumentation recognizes this perturbation and the time at which it occurs to infer that the sensor has reached a predetermined pressure indicating a particular depth. Knowledge of when the predetermined pressure is reached is used to recalculate the probe depth as a function of time for the entire probe descent. Several predetermined depths can be used to more accurately track the descent of the probe along its entire descent path. As a result, a more accurate temperature to depth relationship is developed. In addition, weight and dimension tolerances for the probes can be loosened because the absolute descent rate of each probe is no longer critical to matching probe-to-probe performance characteristics.

Other features and advantages of the invention will be apparent from the following description of the preferred embodiment thereof, and from the claims.

BRIEF DESCRIPTION OF THE DRAWINGS

The foregoing and other objects, features and advantages of the invention will be apparent from the following more particular description of the preferred embodiments of the invention, as illustrated in the accompanying drawings in which like reference characters refer to the same parts through the different views. The drawings are not necessarily to scale, emphasis instead being placed upon illustrating the principles of the invention.

DETAILED DESCRIPTION

Figure 1:
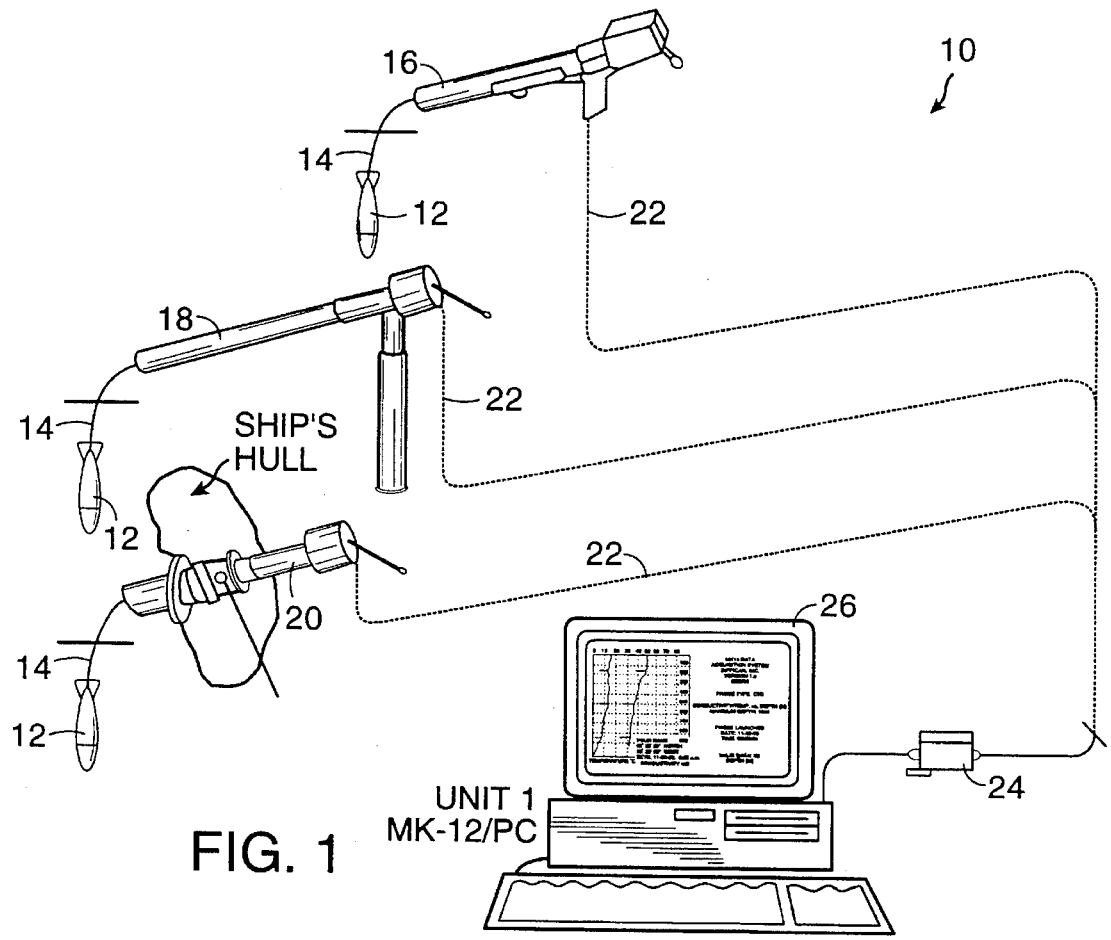
FIG. 1 illustrates an oceanographic data acquisition system featuring depth monitoring surface-launched expendable probes of this invention.

Referring to FIG. 1, an oceanographic probe system 10 of this invention includes an expendable deployable seawater probe 12 having one or more electronic seawater property sensors connected by small gauge wire 14 (e.g., standard 39-gauge BT wire) to a ship borne probe launcher device, such as a hand-held launcher 16 (commercially available as Model No. LM3A from Sippican, Inc., 7 Barnabas Road, Marion, Mass. 02738, the assignee of the present application), a deck mounted launcher 18 (Sippican, Inc. Model No. LM2A), or a through-hull launcher 20 (Sippican, Inc. Model No. LM4A). The small gauge wire 14 is electrically connected, through each launcher 16, 18, 20, to an electronic launcher cable 22, through a connector box 24, and to probe data acquisition instrumentation 26. Instrumentation 26 can be, for example, a Sippican, Inc. Model No. MK12/PC device, which is a personal computer-based probe data acquisition and analysis system.

Figure 2:
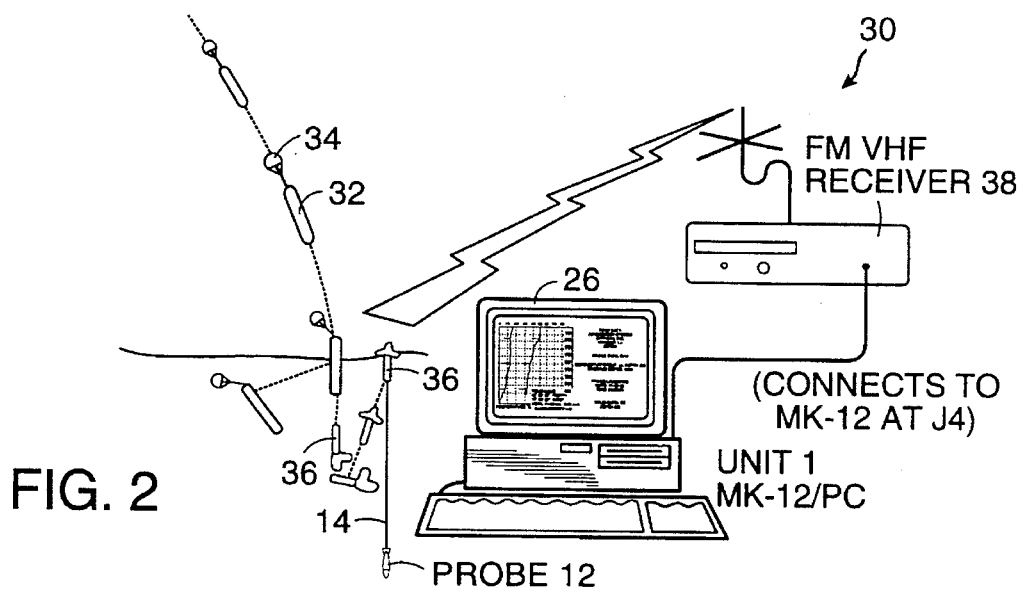
FIG. 2 illustrates an oceanographic data acquisition system featuring depth monitoring air-launched expendable probes of this invention.

Referring to FIG. 2, another oceanographic probe system 30 of this invention features an air-launched expendable probe 12. A probe-buoy launch assembly 32 having a parachute 34 is launched from a ship or aircraft in a manner calculated to land the assembly at the desired ocean target. Once the assembly lands in the water, a buoy 36 separates from the launch assembly and floats to the surface of the water. Once the buoy 36 reaches the ocean surface, it releases expendable probe 12. Probe 12 is connected to the buoy 36 by small gauge wire, e.g., standard 39-gauge BT wire 14. Buoy 36 modulates and radio transmits sensor signals generated by probe 12 to a remote FM VHF radio receiver 38. Radio receiver 38 receives and demodulates the probe sensor signals and sends the demodulated signals to probe data acquisition instrumentation 26 for recording and analysis.

Figure 3:
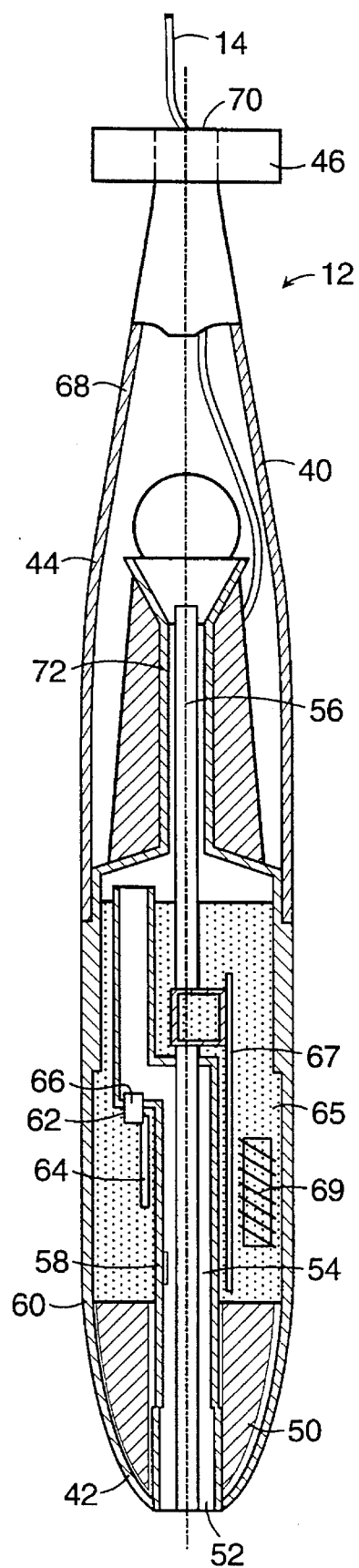
FIG. 3 is a cross-sectional view of an expendable probe featuring the pressure sensor depth monitor of this invention.

Referring to FIG. 3, expendable probe 12 includes a hard plastic shell body 40 having a nose section 42 and an after body section 44. The nose section 42 includes a balanced metallic nose weight 50 (e.g., lead), and the after body 44 includes a finned tail 46 to help stabilize the probe during descent and provides protection for the end of the conductivity cell 56. After body 44 also houses spool 72 around which wire 14 is wound.

The nose 42 has a center opening 52 leading through nose weight 50 to an internal flow tube 54 having an outlet 70 in the tail 46. The flow tube 54 allows seawater to flow through the probe at a predetermined rate which provides the probe with a controlled rate of stable descent through the water. Flow tube 54 also accommodates one or more ocean water sensors, such as an electrical conductivity cell 56 or a temperature measuring thermistor 58. Other types of ocean water sensors that can be placed in an expendable probe include sound velocity sensors, current shear sensors, and light extinction sensors. A pressure sensor of this invention 62 can also be located along the flow tube 54 in a manner exposing the pressure sensing element to the seawater.

Electronics associated with the sensors, such as a pressure sensor circuit board 64 and a temperature/conductivity circuit board 67, as well as power supply components such as a battery 69 can all be encapsulated in a potting material 65 to provide protection from the seawater for the expected life of the probe. The electronics can be seawater activated to provide an accurate starting point for data collection.

The expendability of the probe allows inexpensive components, which quickly degrade in seawater, to be used. Potting encapsulation and careful component selection provide the necessary useful component lifetimes. Batteries are typically encapsulated, single use, and non-rechargeable. Wire insulation may break down quickly, as long as it survives long enough for the buoy to make its full descent. Furthermore, there are no means for retrieval of the probe once it has been launched. The transducer portion 66 of pressure sensor 62 is disposed within flow tube 54 to sense the pressure of the seawater flowing through the probe as it descends in the ocean. Pressure sensor 62 is a solid state, high reliability low-cost pressure sensor, such as a Lucas Nova Sensor NPI-21A (available from Lucas Nova Sensor, 1055 Michigan Court, Fremont, Calif. 94539) which has a pressure range from 0 to 3,000 psi, linearity of ±0.1%, hysteresis and repeatability of ±0.05%, thermal accuracy of offset ±1%, thermal accuracy of full scale output of ±1% and a thermal hysteresis of ±0.1%. These pressure sensors change resistance in response to pressure changes, and can be incorporated into a resistive bridge measurement circuit, or other type of resistive measurement circuit.

Figure 4:
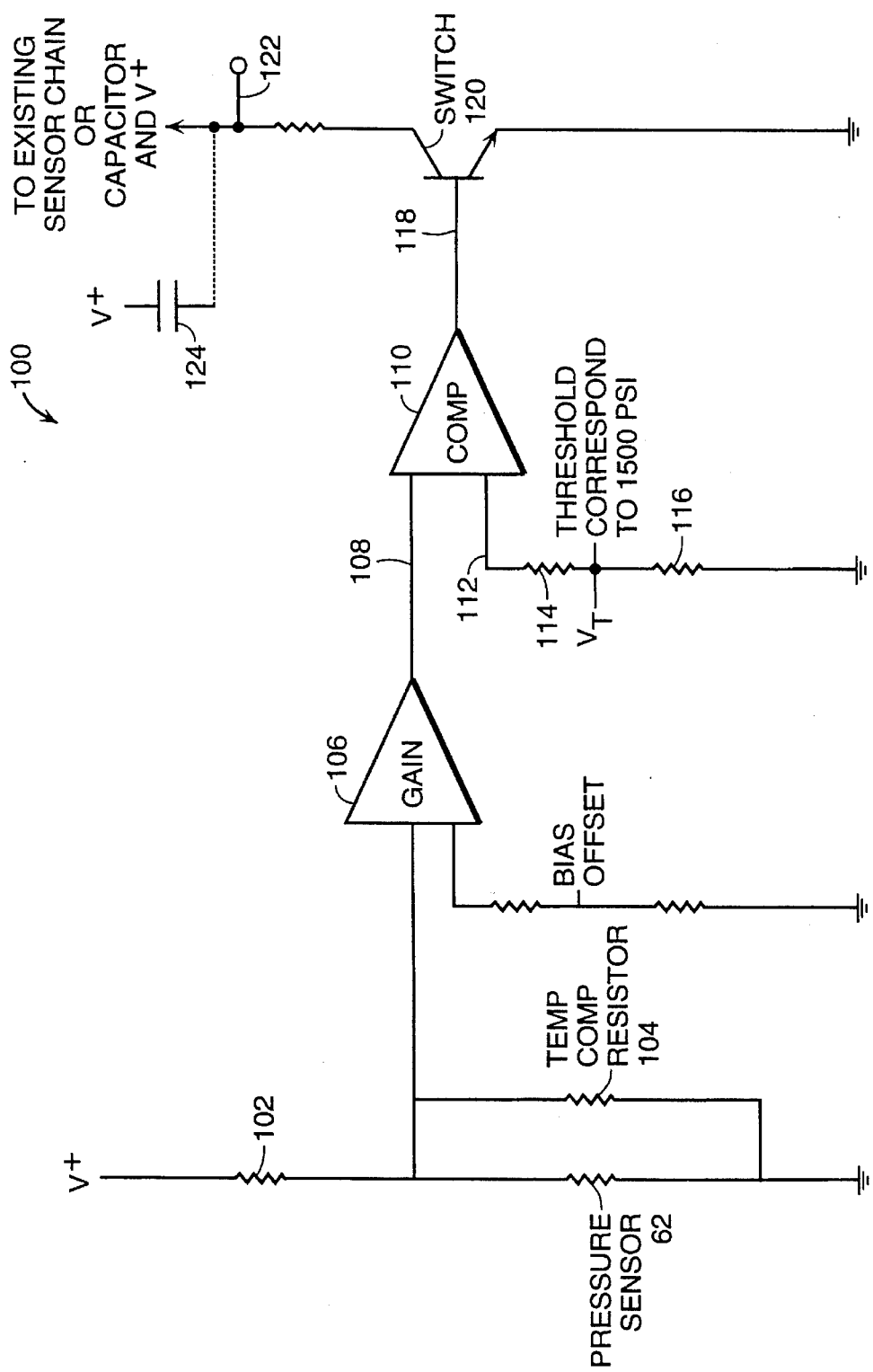
FIG. 4 is an electronic schematic diagram of a pressure threshold circuit for the pressure sensor depth monitor of this invention.

Referring to FIG. 4, a pressure threshold circuit 100 for use with the pressure sensor of this invention compares the output of the pressure sensor 62 against a preset pressure threshold value, and causes a perturbation on one or more of the seawater property sensor signals (e.g., the temperature sensor signal or the conductivity sensor signal) at one or more predetermined depths. Pressure sensor 62 acts as a variable resistor, whose resistance is variable with pressure, and is biased by resistor 102 connected to supply voltage V+ provided by battery 69. A temperature compensation resistor 104 is provided to compensate for changes in the pressure sensor electrical characteristics with changes in temperature.

A voltage is generated across pressure sensor 62 indicative of the ambient pressure around the sensor. The voltage present across pressure sensor 62 is amplified by voltage amplifier 106 and applied to one input 108 of a voltage comparator 110. The voltage applied to the other input 112 of the voltage comparator is set by resistors 114 and 116 to a desired threshold voltage corresponding to a preset pressure. In operation, when the ambient pressure surrounding the pressure sensor causes the output voltage of amplifier 106 to exceed the preset threshold voltage, the output 118 of voltage comparator 110 causes transistor 120 to turn on, thereby pulling down the output signal 122 to effect a triggered condition.

Output signal 122 can be applied through a coupling circuit to perturb a seawater property sensor signal, such as the temperature signal, on a momentary basis sufficient to indicate to the recording instrumentation that a particular depth level has been reached. In one embodiment, the output signal causes a capacitor 124 connected to the V+ power supply line to charge, thereby momentarily pulling the probe power supply voltage down toward ground. This power supply variation would be detectable on all battery-powered probe sensor signals, but would only last as long as necessary to charge the capacitor.

By providing a plurality of voltage comparator circuits, each having a threshold set at a different pressure level, and each having an output signal coupled to a seawater property sensor signal, a perturbation can be caused on the property sensor signal for any number of depths or pressure levels achieved during descent. In another embodiment, the perturbation can be a permanent, predetermined voltage offset applied to a seawater property sensor signal for each new pressure threshold passed by the probe. The resulting seawater property sensor signal would have a stepped characteristic to it.

Figure 5:
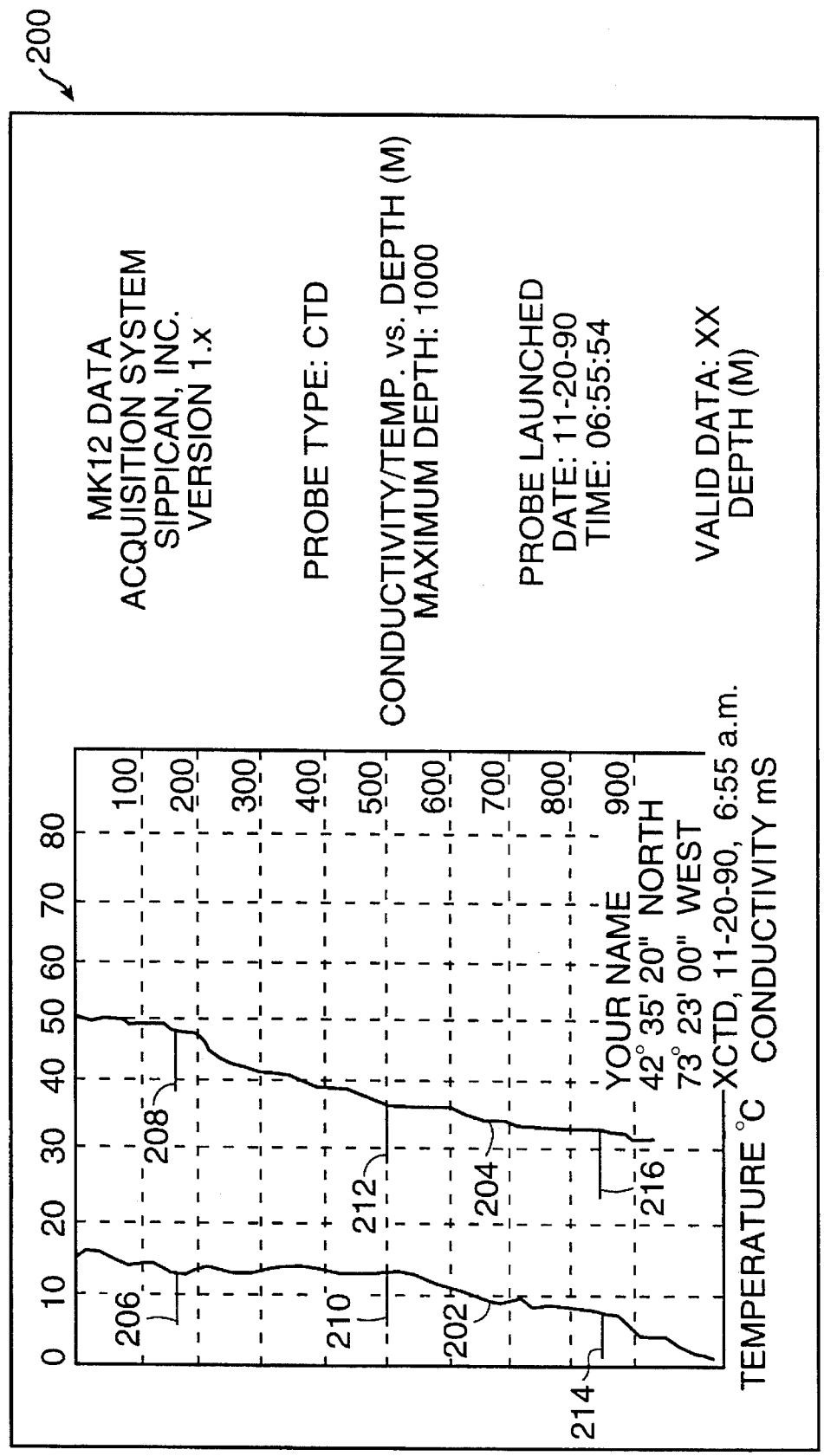
FIG. 5 is an example of a display of a data acquisition system for recording seawater property data from an expendable probe of this invention, featuring perturbations

Referring to FIG. 5, an example of the screen display 200 of the data acquisition instrumentation 26 of FIG. 1 according to this invention includes seawater property sensor 202, 204 measuring a particular parameter versus probe depth. In this example, a pressure sensor has been provided which is preset to perturb the seawater property signals at 150, 500 and 850 meter depths. As shown on the instrumentation display, trace 202 indicates seawater temperature, while trace 204 indicates seawater conductivity. A first depth perturbation 206, 208 spike appears on each trace at an indicated depth of 150 meters. A second spike 210, 212 appears on each trace at 500 meters, and a third spike 214, 216 appears on each trace at 850 meters depth. These pressure signals can also be used internally by the instrumentation to calibrate the depth of the measured data.

The invention may be embodied in other specific forms without departing from the spirit and the essential characteristics thereof. Accordingly, the invention is to be defined not by the proceeding description, which is intended as illustrative, but by the claims that follow.

What is claimed is:

1. An expendable oceanographic probe for use in seawater, comprising:

a body having a weighted nose section and an after body having a tail for stabilization, and including a spool of cable paid out through the tail of the after body for coupling to a data acquisition system located above the surface of the seawater;

a seawater property sensor exposed to the seawater for measuring a seawater property, and for providing over the cable to the data acquisition system a property signal representing the measured seawater property;

a pressure sensor exposed to the seawater for generating a pressure signal representing the pressure of the seawater as the probe descends into the seawater; and a pressure circuit for receiving the pressure signal from the pressure sensor and or using the pressure signal to perturb the property signal at a predetermine seawater pressure by making a change in the property signal that is noticeable by the data acquisition system and that is sufficiently long in duration to indicate to the data acquisition system that the probe has achieved the predetermined seawater pressure during its descent into the seawater, thereby providing over the cable to the data acquisition system information about the measured seawater property and information about the seawater pressure.

2. The expendable probe of claim 1 wherein the pressure circuit uses the pressure signal to perturb the property signal at a plurality of predetermined seawater pressures.

3. The expendable probe of claim 1 wherein the pressure circuit comprises:

a pressure threshold comparator for comparing the pressure signal generated by the pressure sensor to a preset level corresponding to a predetermined pressure threshold, and for providing a threshold output signal having a triggered condition indicating that ambient pressure surrounding the pressure sensor exceeds the preset level; and a coupling circuit for coupling the threshold output signal to the property signal to perturb the property signal upon the threshold output signal obtaining the triggered condition.

4. The expendable probe of claim 3:

further comprising a plurality of the pressure threshold comparators for comparing the pressure signal generated by the pressure sensor to a plurality of the preset levels which each corresponds to a predetermined pressure threshold, and each of the comparators providing a threshold output signal having a triggered condition indicating that ambient pressure surrounding the pressure sensor exceeds the preset level for that comparator; and wherein the coupling circuit couples each threshold output signal to the property signal to perturb the property signal upon each threshold output signal obtaining the triggered condition.

5. The expendable probe of claim 1 wherein the pressure circuit perturbs the property signal by making a step change in the property signal.

6. The expendable probe of claim 3 wherein the coupling circuit perturbs the property signal, upon the threshold output signal obtaining the triggered condition, by making a step change in the property signal.

7. The expendable probe of claim 2 wherein the pressure circuit perturbs the property signal at each of the plurality of predetermined seawater pressures by making a step change in the property signal.

8. The expendable probe of claim 4 wherein the coupling circuit perturbs the property signal, upon each threshold output signal obtaining the triggered condition, by making a step change in the property signal.

* * * * *